United States Patent
Eriksson

(10) Patent No.: US 12,381,598 B2
(45) Date of Patent: Aug. 5, 2025

(54) ELECTROMAGNETIC DEVICE AND CONDITION-MONITORING AND/OR CONTROL SYSTEM, METHOD AND USE

(71) Applicant: Hitachi Energy Ltd, Zürich (CH)

(72) Inventor: Goran Eriksson, Västerås (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/846,442

(22) PCT Filed: Mar. 22, 2023

(86) PCT No.: PCT/EP2023/057361
§ 371 (c)(1),
(2) Date: Sep. 12, 2024

(87) PCT Pub. No.: WO2023/186667
PCT Pub. Date: Oct. 5, 2023

(65) Prior Publication Data
US 2025/0112669 A1    Apr. 3, 2025

(30) Foreign Application Priority Data
Mar. 29, 2022  (EP) .................................... 22164955

(51) Int. Cl.
*H04B 7/15*    (2006.01)
*H04B 5/00*    (2024.01)
(Continued)

(52) U.S. Cl.
CPC ................ *H04B 5/79* (2024.01); *H04B 5/48* (2024.01)

(58) Field of Classification Search
None
See application file for complete search history.

(56) References Cited

U.S. PATENT DOCUMENTS 8,970,332 B2 *  3/2015  DiFonzo .............. H01R 13/641
                                              335/206
8,983,529 B2 *  3/2015  Akiyama ......... G06K 19/07749
                                              343/866
(Continued)

FOREIGN PATENT DOCUMENTS

CN      103329397 A      9/2013
CN      108541352 A      9/2018
(Continued)

OTHER PUBLICATIONS

International Search Report and Written Opinion of the International Searching Authority, International Application No. PCT/EP2023/057361, mailed Jun. 30, 2023, 11 pages.
(Continued)

*Primary Examiner* — Tuan A Tran
(74) *Attorney, Agent, or Firm* — Sage Patent Group

(57) ABSTRACT

An electromagnetic device comprising a magnetic field-generating electric circuit comprising at least one winding, and a system configured to monitor a condition of the electromagnetic device and/or to control the electromagnetic device. The condition-monitoring and/or control system comprises at least one first device comprising a transmitter/transceiver, and at least one second device comprising a receiver/transceiver, whereby the at least one first device is configured to wirelessly transmit at least one signal to the at least one second device. The at least one first device is configured to transmit the at least one signal at a frequency that corresponds to a resonance frequency of the at least one winding of the electromagnetic device, whereby the electromagnetic device is thereby configured to be used as a passive repeater for the at least one signal that is transmitted.

14 Claims, 7 Drawing Sheets

(51) Int. Cl.
  *H04B 5/02* (2006.01)
  *H04B 5/48* (2024.01)
  *H04B 5/79* (2024.01)
  *H04W 4/00* (2018.01)
  *H04W 12/06* (2021.01)
  *H04W 52/02* (2009.01)

(56) References Cited

U.S. PATENT DOCUMENTS

| | | | |
|---|---|---|---|
| 8,995,957 B2* | 3/2015 | Ohira | H04B 5/24 |
| | | | 455/410 |
| 9,197,312 B2* | 11/2015 | Wendling | H04N 21/47815 |
| 9,219,529 B2* | 12/2015 | Akiyama | G06K 19/07756 |
| 9,231,410 B2* | 1/2016 | Wojcik | H02J 7/0042 |
| 9,313,733 B2* | 4/2016 | Moshfeghi | H04W 52/0206 |
| 9,344,154 B2* | 5/2016 | Wendling | H04N 21/43637 |
| 9,437,061 B2* | 9/2016 | Mehl | G07C 9/28 |
| 9,602,163 B2* | 3/2017 | Schultz | H02J 50/90 |
| 9,710,681 B2* | 7/2017 | Akiyama | H04B 5/266 |
| 9,949,642 B2* | 4/2018 | Love | A61B 5/14532 |
| 10,609,643 B1* | 3/2020 | Le | H04B 5/48 |
| 11,336,332 B2* | 5/2022 | Spick | G06K 7/10178 |
| 11,516,895 B2* | 11/2022 | Ettes | H05B 6/1263 |
| 12,212,155 B2* | 1/2025 | Melone | H02J 50/40 |
| 2014/0139037 A1 | 5/2014 | John et al. | |
| 2015/0102941 A1* | 4/2015 | Keech | H04B 7/145 |
| | | | 340/870.02 |

FOREIGN PATENT DOCUMENTS

| | | |
|---|---|---|
| CN | 111884359 A | 11/2020 |
| WO | 2012037279 A1 | 3/2012 |
| WO | 2014139037 A1 | 9/2014 |

OTHER PUBLICATIONS

Extended European Search Report, European Application No. 22164955.1, mailed Sep. 15, 2024, 7 pages.

Chinese Office Action, Chinese Patent Application No. 202380031151.0, mailed Jan. 21, 2025, 6 pages.

* cited by examiner

ELECTROMAGNETIC DEVICE AND CONDITION-MONITORING AND/OR CONTROL SYSTEM, METHOD AND USE

CROSS-REFERENCE TO RELATED APPLICATIONS

This application is a 35 U.S.C. § 371 national stage application of PCT International Application No. PCT/EP2023/057361 filed on Mar. 22, 2023, which in turn claims priority to European Patent Application No. 22164955.1, filed on Mar. 29, 2022, the disclosures and content of which are incorporated by reference herein in their entireties.

TECHNICAL FIELD

The present disclosure concerns an electromagnetic device comprising a magnetic field-generating electric circuit, and a system configured to monitor a condition of that electromagnetic device and/or to control that electromagnetic device. The present disclosure also concerns a method for monitoring and/or controlling an electromagnetic device. The present disclosure further concerns the use of an electromagnetic device by its monitoring and/or control system.

BACKGROUND OF THE INVENTION

Systems that monitor the condition of electromagnetic devices comprising a magnetic field-generating electric circuit, such as transformers or reactors, and/or systems that control such electromagnetic devices are well known. Various physical properties of interest related to the operation of such an electromagnetic device may be monitored and assessed by such systems to predict and prevent the failure of the electromagnetic device.

For example, temperature and moisture sensors may be used to determine the temperature of a transformer's or reactor's insulating fluid and the moisture content inside a transformer tank or reactor tank. Data from a condition-monitoring system may be used to trigger alarms to allow problems to be detected early and/or to allow appropriate action to be taken before problems escalate. Alternatively or additionally, data from a condition-monitoring system may be used to initiate protective measures, such as starting cooling fans or pumps to circulate insulating fluid to assist in cooling a transformer's or reactor's windings, core and structural components. A control system may be used to regulate the temperature of a transformer or reactor and/or the output voltage of a transformer or reactor.

Condition-monitoring sensors and control units located in the vicinity of a transformer or reactor can be configured to send data to a local and/or remote processor, control system, user interface, or gateway via serial or parallel communication and/or Ethernet links using optic fibre, wire, a radio system which typically operates in the MHz or GHz frequency range, or a Powerline Communication System (PCS).

Wireless transfer of data is becoming increasingly important in modern power transmission installations, such as substations and converter stations, especially when data or power transfer is required to or from sensors and control units placed at high voltage positions. However, reliable and robust signal transfer in such harsh electromagnetic environments requires the highest possible signal strength at the position of the receiving antenna.

In many situations, for instance when communication is required within a transformer tank, the transfer of signals may become very challenging because of the surrounding complex three-dimensional geometry which contains many conducting parts that may screen the propagating electromagnetic field. Frequently, the only solution is to introduce additional receivers or transmitters acting as repeaters, or relay transmitters, so that a signal from a sensor can be transferred to a remote terminal unit (RTU) or desired gateway. This may not only be costly, but may also lead to problems related to manufacture and installation, and may increase the risk of electrical discharges occurring.

It is well-known that the range of wireless data transfer systems can be improved by adding passive repeaters consisting of inductive or capacitive resonance circuits tuned to the frequency used for the transmission (see for example the article entitled "Inductive coupling for wireless power transfer and near-field communication" by Christoph Degen, which was published in the Journal on Wireless Communications and Networking in 2021). The repeaters absorb the received signal and re-emit it in a very efficient manner. Communication can therefore be established between transmitters and receivers even when there are conducting structures preventing direct communication. Moreover, the possible range of communication can be increased by using such repeaters.

SUMMARY OF THE INVENTION

An object of aspects of the present disclosure is to provide an improved arrangement of an electromagnetic device comprising a magnetic field-generating electric circuit comprising at least one winding, and a system configured to monitor a condition of that electromagnetic device and/or to control that electromagnetic device.

This object is achieved by the electromagnetic device comprising at least one winding and the condition-monitoring and/or control system recited in claim 1.

The condition-monitoring and/or control system comprises at least one first device comprising a transmitter/transceiver and at least one second device comprising a receiver/transceiver. The at least one first device is configured to wirelessly transmit at least one signal to the at least one second device. The at least one first device is configured to transmit the at least one signal at a frequency that corresponds to a resonance frequency of the at least one winding of the electromagnetic device, whereby the electromagnetic device is thereby configured to be used as a passive repeater for the at least one signal that is transmitted.

The electromagnetic device being monitored and/or controlled possesses resonance (natural) frequencies, which exist because its one or more windings can be seen as a number of series inductances and shunt capacitances. When the electromagnetic device is excited by a voltage that oscillates with a frequency equal to one or more of the resonance frequencies, a resonance occurs. The electromagnetic device will thereby function as an inductive coupler which retrieves the at least one signal from a signal-transmitting device of the monitoring and/or control system and relay it to a signal-receiving device of the monitoring and/or control system. This enables efficient signal transfer between a transmitter and a receiver located anywhere in the surroundings or interior of the at least one winding of the electromagnetic device.

An extended range of wireless signal transfer will thereby be achieved and the possibility of establishing communication with wireless equipment placed at screened positions within complex conducting structures will be enhanced. Furthermore, there will be no need to add extra components, such as additional receivers or transmitters acting as repeaters, or relay transmitters to enhance the at least one signal transmitted between the at least one first device and the at least one second device. Additionally, these improvements are achieved at no extra cost since no additional signal-transmission-enhancing components are needed besides already resonance structure that exists in the electromagnetic device that is being monitored and/or controlled.

The values of each winding's inductances and the inter-turn capacitances determine the spectrum of eigenmodes that can be excited by the at least one first device. The lowest resonance frequency corresponds to the fundamental eigenmode, where the total electrical conductor length along a winding is of the order of the wavelength. This mode is of global nature and the generated electromagnetic field decays relatively slowly as the distance to the winding increases. Higher-order modes, where the electrical conductor length is an integer multiple of half wavelengths, have a finer structure and their fields decays faster was the distance to the winding increases.

The term "a resonance frequency of the at least one winding of the electromagnetic device" as used in this document is intended to mean the at least one first device is configured to transmit at least one signal at a frequency that corresponds to that of the winding resonance of the electromagnetic device being monitored and/or controlled by the condition-monitoring and/or control system, which is to be exploited to ensure that the resonance coupling is optimized.

According to an embodiment of aspects of the present disclosure the electromagnetic device comprising a magnetic field-generating electric circuit comprising at least one winding comprises at least one of the following: a transformer, a power transformer, a reactor, a generator, a rotating electric machine, a synchronous machine, an asynchronous machine, a motor, a power electronics-based device, such as a High Voltage Direct Current (HVDC) installation or a Flexible AC Transmission System (FACTS) installation. Aspects of the present disclosure may namely be used to monitor the condition and/or control any electromagnetic device comprising a magnetic field-generating electric circuit comprising at least one winding that is used in any application.

The term "winding" as used herein is intended to mean one or more turns of an electrical conductor, such as wire, forming a continuous path through which electric current can flow. The term "coil" may also be used to describe one or more windings in which an electrical conductor is wound in the shape of a ring, a joined sequence of concentric rings, a spiral, a helix, or any other shape.

According to an embodiment of aspects of the present disclosure the at least one signal is at least one data signal or at least one power signal, or a combination of at least one data signal and at least one power signal. The at least one first device may namely be configured to transmit one or more data signals, one or more power signals, or both one or more data signals and one or more power signals. The electromagnetic device being monitored and/or controlled can thereby be used as a passive repeater for data communication and/or power transfer.

A wireless communication and/or power transfer system may be established in an environment close to an electromagnetic device and may provide maximum power transfer efficiency without the need to add any signal-transmission-enhancing components between the signal transmitter/transceiver of the at least one first device and the receiver/transceiver of the at least second device.

According to an embodiment of aspects of the present disclosure the monitoring and/or control system lacks additional receivers, transmitters or transceivers acting solely as repeaters or relay transmitters to enhance the transmission of the at least one signal. The electromagnetic device that is being monitored and/or controlled by the condition-monitoring and/or control system is the only component of the condition-monitoring and/or control system which is configured to function as a repeater for the at least one signal that is transmitted. In some embodiments, the only transmitters, receivers and/or transceivers included in the monitoring and/or control system are the transmitters/transceivers included in the at least one first device and the receivers/transceivers in the at least one second device, which are configured to transmit at least one signal from the at least one first device directly to the at least one second device via the electromagnetic device that is being monitored and/or controlled without being enhanced by an additional designated receiver, transmitters or transceiver.

According to an embodiment of aspects of the present disclosure the at least one first device and the at least one second device may be any one or more devices that are configured to transmit and/or receive data and/or to transmit and/or receive power. The at least one first device and the at least one second device may comprise at least one of the following: a sensor, a control unit, an energy harvesting device, a processor, a display means, a user interface, a remote terminal unit (RTU), a data storage unit, a gateway. Data or power may namely be transferred between any two or more devices of the condition-monitoring and/or control system for the purpose of monitoring a condition of the electromagnetic device and/or controlling the electromagnetic device.

According to an embodiment of aspects of the present disclosure the at least one first device and/or the at least one second device is/are located at one of the following locations: radially within the at least one winding of the electromagnetic device, inside a tank of the electromagnetic device, at a distance of less than 50 metres, less than 40 metres, less than 30 metres, less than 20 metres or less than 10 metres from the at least one winding of the electromagnetic device. At least one, some, or all of the at least one first devices and the at least one second devices in any of the embodiments of the present disclosure may namely be located at a distance of less than 50 metres, less than 40 metres, less than 30 metres, less than 20 metres or less than 10 metres from the at least one winding of the electromagnetic device.

Aspects of the present disclosure may be used in the vicinity of one or more large windings of an electromagnetic device, i.e. one or more windings having a diameter of more than one metre, such as the windings used in HVDC/FACTS installations.

According to an embodiment of aspects of the present disclosure the frequency is a frequency in the range from 1 kHz to 1 GHZ, such as 1-1000 kHz, 1-500 kHz, 500-1000 KHz, 0.005-10 MHz, 0.01-10 MHz, 1.0-10 MHz, 1.0-100 MHz, 100 MHz-1 GHz. The relevant frequency for electromagnetic devices such as power transformers may be in the range 10 KHz to 1 MHz for example. The relevant frequency for electromagnetic devices with smaller geometrical dimensions may be higher than 1 MHz and up to 1 GHz for example.

Aspects of the present disclosure also concerns a method for monitoring a condition of an electromagnetic device comprising at least one winding, and/or for controlling an electromagnetic device comprising at least one winding. The method comprises the steps of providing a condition-monitoring and/or control system that comprises at least one first device comprising a transmitter/transceiver and at least one second device comprising a receiver/transceiver, and wirelessly transmitting at least one signal from the at least one first device to the at least one second device. The method also comprises the step of configuring the at least one first device to transmit the at least one signal at a frequency that corresponds to a resonance frequency of the at least one winding of the electromagnetic device that is to be monitored and/or controlled by the condition-monitoring and/or control system, thereby using the electromagnetic device as a passive repeater for the at least one signal that is transmitted.

Such a method may be implemented using any of the arrangements of an electromagnetic device comprising a magnetic field-generating electric circuit comprising at least one winding and a condition-monitoring and/or system according to any of the embodiments described in this document.

According to an embodiment of aspects of the present disclosure the method comprises the step of wirelessly transmitting at least one data signal and/or at least one power signal.

According to an embodiment of aspects of the present disclosure the method lacks a step of wirelessly transmitting the at least one signal using additional receivers or transmitters acting solely as repeaters or relay transmitters to enhance the transmission of the at least one signal, whereby the electromagnetic device being monitored and/or controlled is the only designated passive repeater used in the method according to aspects of the present disclosure.

According to an embodiment of aspects of the present disclosure the at least one first device and the at least one second device may be any one or more devices that are configured to transmit and/or receive data and/or to transmit and/or receive power. The at least one first device and the at least one second device may comprise at least one of the following: a sensor, a control unit, an energy harvesting device, a processor, a display means, a user interface, a remote terminal unit (RTU), a data storage unit, a gateway.

According to an embodiment of aspects of the present disclosure the method comprises the step of locating the at least one first device and/or the at least one second device at one of the following locations: radially within the at least one winding of the electromagnetic device, inside a tank of the electromagnetic device, at a distance of less than 50 metres, less than 40 metres, less than 30 metres, less than 20 metres or less than 10 metres from the at least one winding of the electromagnetic device.

According to an embodiment of aspects of the present disclosure the frequency is a frequency in the range from 1 kHz to 1 GHz, such as 1-1000 kHz, 1-500 kHz, 500-1000 KHz, 0.005-10 MHz, 0.01-10 MHz, 1.0-10 MHz, 1.0-100 MHz, 100 MHz-1 GHz.

According to an embodiment of aspects of the present disclosure the electromagnetic device comprising a magnetic field-generating electric circuit comprising at least one winding comprises at least one of the following: a transformer, a power transformer, a reactor, a generator, a rotating electric machine, a synchronous machine, an asynchronous machine, a motor, a power electronics-based device, such as a High Voltage Direct Current (HVDC) installation or Flexible AC Transmission System (FACTS).

The present also concerns the use of the at least one winding of an electromagnetic device comprising a magnetic field-generating electric circuit that is being monitored and/or controlled by a condition-monitoring and/or control system as a passive repeater to enhance the transmission of at least one signal sent from a transmitter to a receiver of its condition-monitoring and/or control system. An arrangement of an electromagnetic device and a condition-monitoring and/or control system according to any of the embodiments described herein may be used in this way.

BRIEF DESCRIPTION OF THE DRAWINGS

Aspects of the present disclosure will hereinafter be further explained by means of non-limiting examples with reference to the appended figures where.

It should be noted that the drawings have not necessarily been drawn to scale and that the dimensions of certain features may have been exaggerated for the sake of clarity.

DETAILED DESCRIPTION OF EMBODIMENTS

Figure 1:
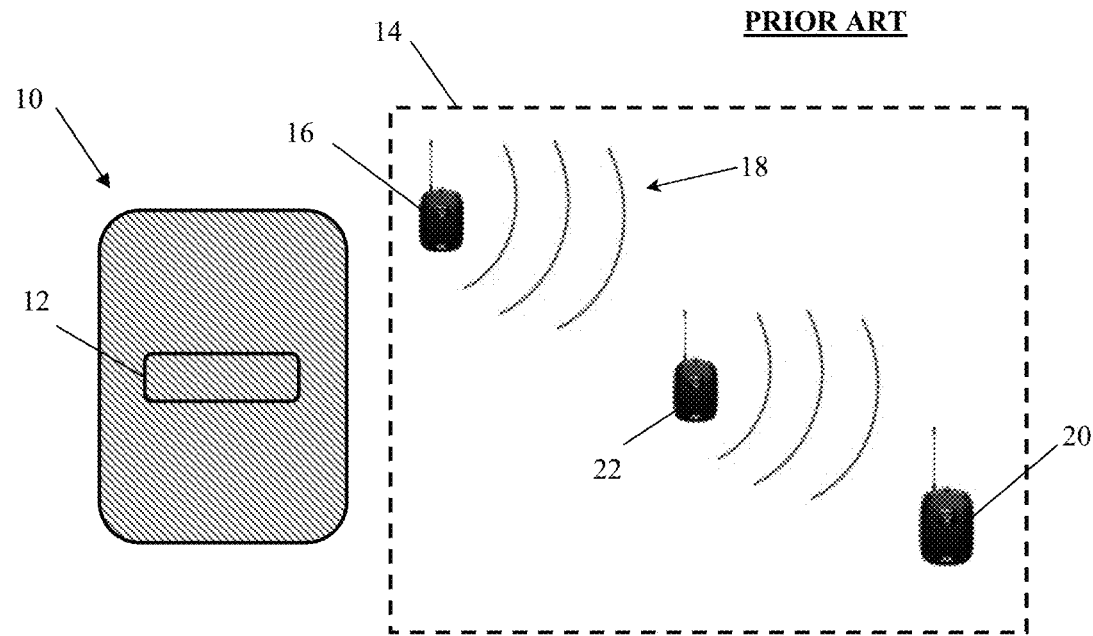
FIG. 1 schematically shows an electromagnetic device comprising a magnetic field-generating electric circuit and a condition-monitoring and/or control system according to the prior art, FIG. 2 schematically shows an electromagnetic device comprising a magnetic field-generating electric circuit and a condition-monitoring and/or control system according to an embodiment of aspects of the present disclosure.

FIG. 1 shows an electromagnetic device comprising a magnetic field-generating electric circuit 10 comprising at least one winding 12, and a known system 14 configured to monitor a condition of the electromagnetic device 10 and/or to control the electromagnetic device 10 according to the prior art. The known condition-monitoring and/or control system 14 comprises a transmitter 16 that is configured to wirelessly transmit a signal 18 to a receiver 20. A repeater 22 is placed between the transmitter 16 and the receiver 20 to enhance the transmission of the signal 18.

Figure 2:
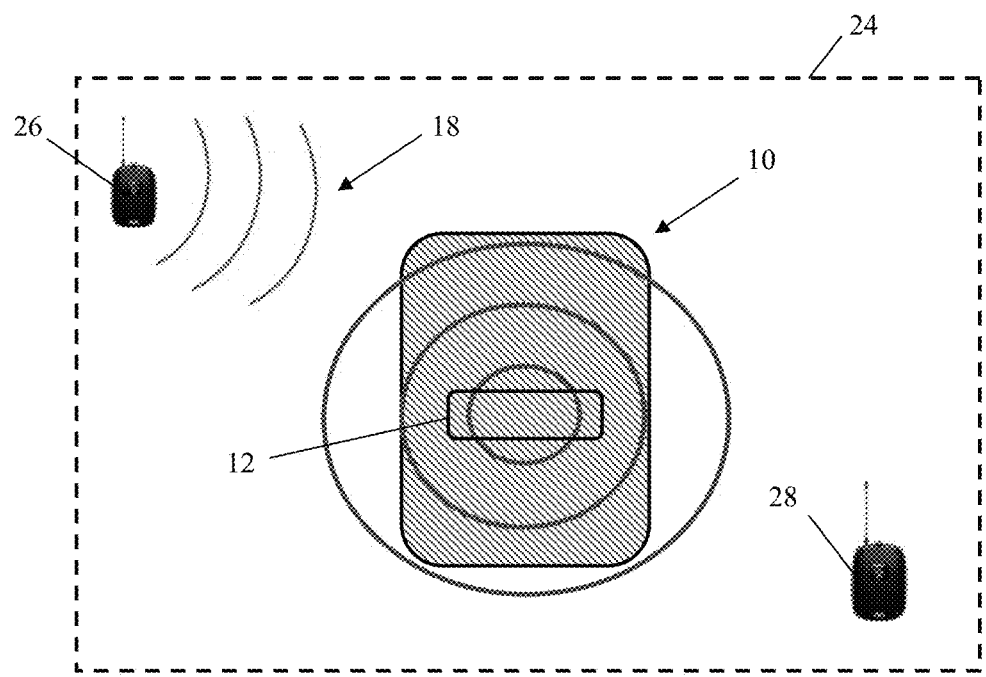

FIG. 2 shows an electromagnetic device 10 comprising a magnetic field-generating electric circuit comprising at least one winding 12, such as a transformer, and a system 24 configured to monitor a condition of the electromagnetic device 10 and/or to control the electromagnetic device 10 according to aspects of the present disclosure. The condition-monitoring and/or control system 24 comprises a first device 26 comprising a transmitter/transceiver that is configured to wirelessly transmit at least one signal 18, such as a data signal containing information regarding the temperature of fluid in the transformer's tank, to a second device 28 comprising a receiver/transceiver, such as a processor. It should be noted that the first and/or second devices according to any embodiments of aspects of the present disclosure may be configured to transmit and/or receive at least one signal 18 from any one or more devices of the condition-monitoring and/or control system 24.

The at least one first device 26 is configured to transmit the at least one signal 18 at a frequency that corresponds to a resonance frequency of the at least one winding 12 of the electromagnetic device 10, whereby the electromagnetic device 10 is thereby configured to be used as a passive repeater for the at least one signal 18 that is transmitted. The electromagnetic device 10 being monitored and/or controlled by the condition-monitoring and/or control system 24 is therefore part of the condition-monitoring and/or control system 24 as regards data communication and/or power transfer within the condition-monitoring and/or control system 24. There is consequently no need for the condition-monitoring and/or control system 24 to comprise additional receivers or transmitters acting solely as repeaters or relay transmitters to enhance the transmission of the at least one signal, such as the repeater 22 shown in FIG. 1, to enhance the at least one signal 18 being transmitted.

Additionally or alternatively the at least one signal 18 may be a power signal. The electromagnetic device 10 being monitored and/or controlled by the condition-monitoring and/or control system 24 can thereby be used to facilitate wireless communication between the devices 26 and 28 of the condition-monitoring and/or control system 24. Additionally or alternatively, the electromagnetic device being monitored and/or controlled by the condition-monitoring and/or control system 24 can thereby be used to facilitate energy harvesting.

The one or more first devices 26 and/or the one or more second devices 28 may any type of sensor for monitoring a condition of the electromagnetic device, such as temperature sensor, to measure the insulating oil or winding temperature for example, an electrical partial discharge monitor, or a dissolved gas and moisture in oil analysis device.

The one or more first devices 26 and/or the one or more second devices 28 may comprise a bushing health monitor that is configured to calculate and report the capacitance and power factor of each bushing using data received from one or more associated bushing sensors connected to the bushing capacitance tap and may utilize oil temperature, humidity and load current measurements from associated sensors.

The at least one first device 26 and/or the at least one second device 28 may be located at any suitable location, such as at one of the following locations: radially within the at least one winding 12 of the electromagnetic device 10, inside a tank of the electromagnetic device 10, at a distance of less than 50 metres from the at least one winding 12 of the electromagnetic device 10. An installer's installation options will be increased since the at least one first device 26 and the at least one second device 28 of the condition-monitoring and/or control system 24 may be located at any suitable locations around the at least one winding 12 of the electromagnetic device 10 being monitored and/or controlled.

Figure 3:
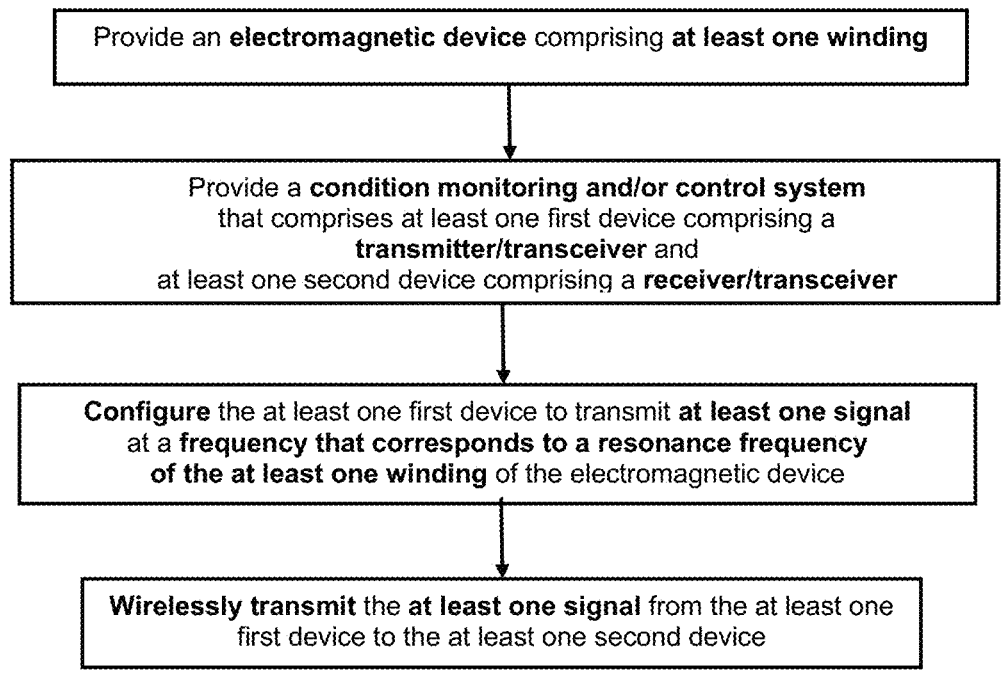
FIG. 3 is a flow diagram showing the steps of a method according to an embodiment of aspects of the present disclosure.

FIG. 3 is a flow chart showing the essential steps of a method for monitoring a condition of an electromagnetic device comprising at least one winding, and/or for controlling an electromagnetic device comprising at least one winding according to aspects of the present disclosure. The method steps of a method according to any embodiment of aspects of the present disclosure may be carried out in any suitable order.

The method comprises the steps of providing a condition-monitoring and/or control system that comprises at least one first device comprising a transmitter/transceiver and at least one second device comprising a receiver/transceiver so that at least one signal can be wirelessly transmitted from the at least one first device to the at least one second device, and configuring the at least one first device to transmit the at least one signal at a frequency that corresponds to a resonance frequency of the at least one winding of the electromagnetic device that is to be monitored and/or controlled by the condition-monitoring and/or control system. At least one data signal and/or at least one power signal may then be wirelessly transmitted from the at least one first device to the at least one second device using the electromagnetic device as a passive repeater.

A simple transformer model is used to illustrate the principle behind aspects of the present disclosure in the following illustrative example.

Illustrative Example

Figure 4:
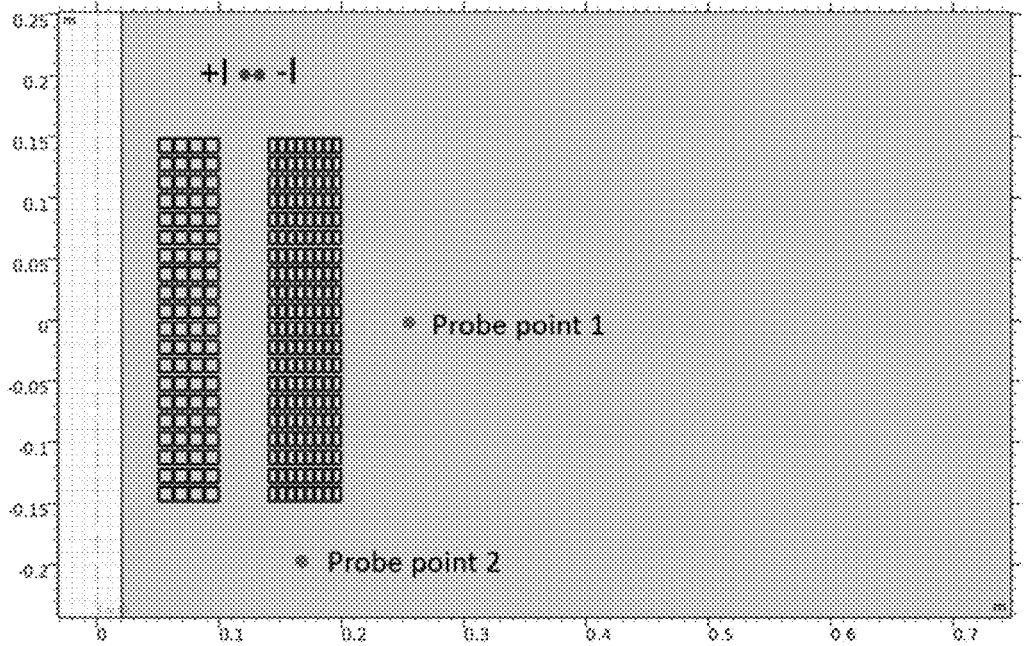
FIG. 4 shows a two-dimensional axisymmetric winding geometry.

The basic principle employing a simple 2D axisymmetric COMSOL model of two windings in a single-phase (downscaled) transformer is illustrated below (see FIG. 4). The two windings are both open-circuited, i.e., no current is flowing at their respective top and bottom connections. In this way the effect of the internal winding resonances can be isolated without including the influence of the external circuitry. Two closely positioned line currents (actually ring currents circulating around the symmetry axis of the configuration) carrying equal but oppositely directed currents ±I are introduced as a transmitter. The magnetic flux density is numerically computed in the whole computational domain and is particularly monitored at two probe points located beside and below the coils, respectively. The inner (low voltage) and outer (high voltage) coils have a different number of turns.

Despite being a 2D axisymmetric model, the specific RLC Coil Group feature in COMSOL allows the modelling of conduction current flowing along the windings, i.e. from turn to turn. Also, the capacitive coupling between different turns is taken into account by including the associated displacement current in the current balance. In this way transmission line winding resonances are properly described in the simulations. To understand the effect of coil resonances, five different configurations are simulated:
1. No coils. Both coils are removed from the model.
2. Two coils. Here, both coils are included in the simulation and the resonances are fully described.
3. One coil. Same as configuration 2 above, but with the inner (low voltage) winding removed from the model.
4. One coil, No inter-turn C. Same as configuration 3, but removing the RLC feature, meaning that current cannot flow from turn to turn and there is no capacitive coupling between turns.
5. One coil, No inter-turn C, Iphi=0. Same as configuration 4 with the additional constraint that the total current in each turn vanishes.

Figure 5:
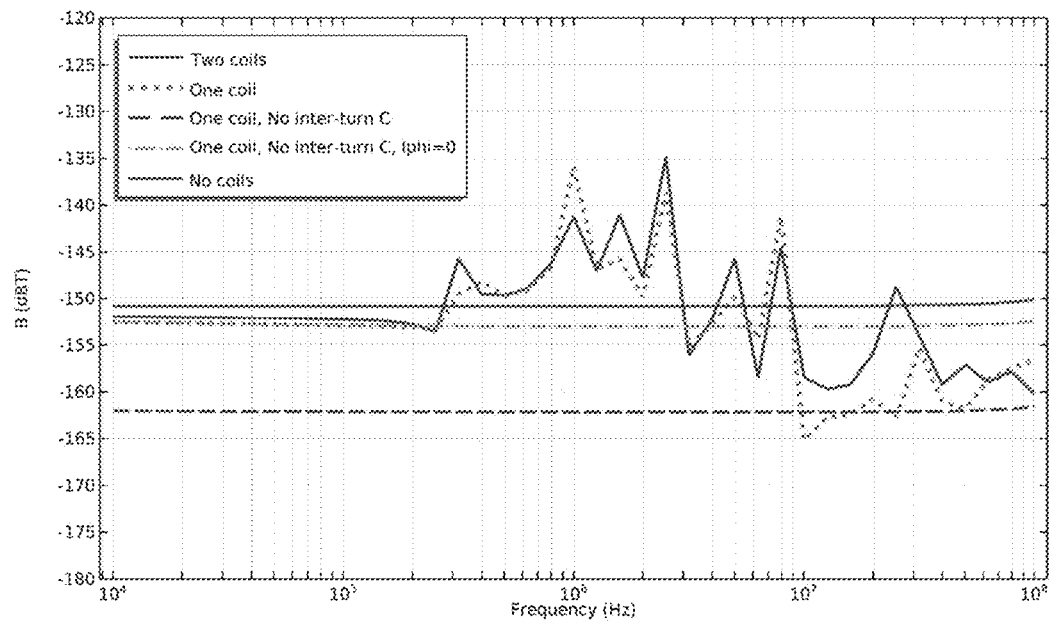
FIG. 5 shows magnetic flux density amplitude at probe point 1.
Figure 6:
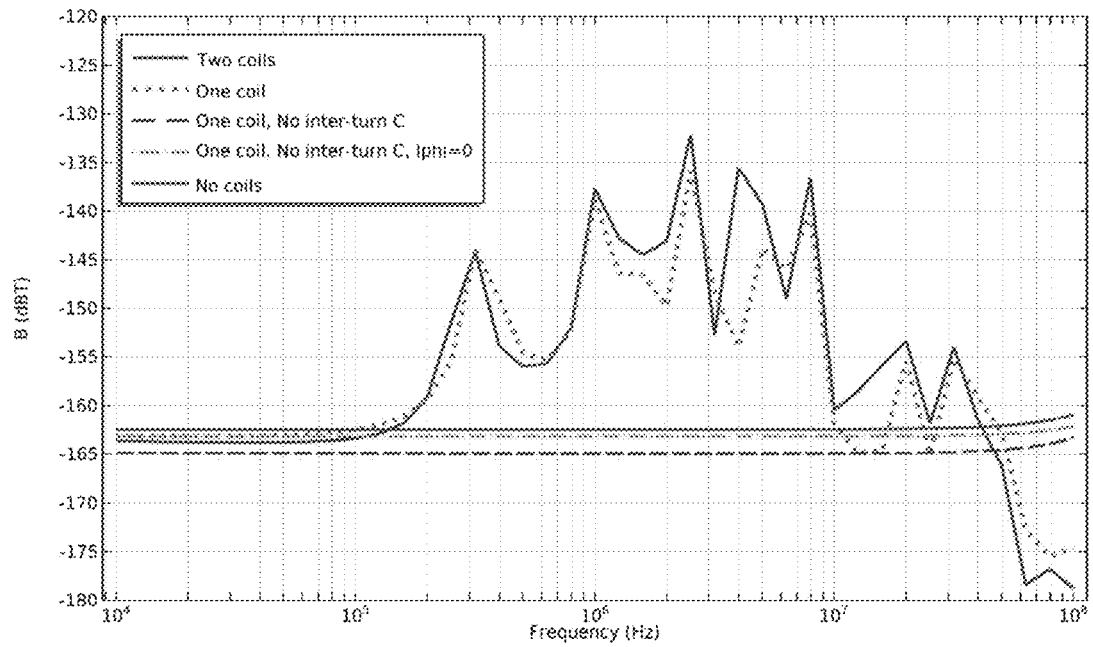
FIG. 6 shows magnetic flux density amplitude at probe point 2.

The magnetic flux density amplitude, expressed in dBT, at the two probe positions is plotted in FIGS. 5 and 6, assuming the source current is I=1 A.

As is clearly seen in FIGS. 5 and 6, in the frequency range where winding resonances are prominent, there is a significant increase in signal amplitude compared to when there are no coils present or when resonances are not allowed to be excited. Up to a 30 dB increase is observed at probe position 2. The minor differences between the one- and two-coil arrangements are due to the different resonance frequencies of the two coils. The distribution of the magnetic flux density for some of the cases and at some frequencies of interest is shown in FIGS. 7-14.

Figure 7:
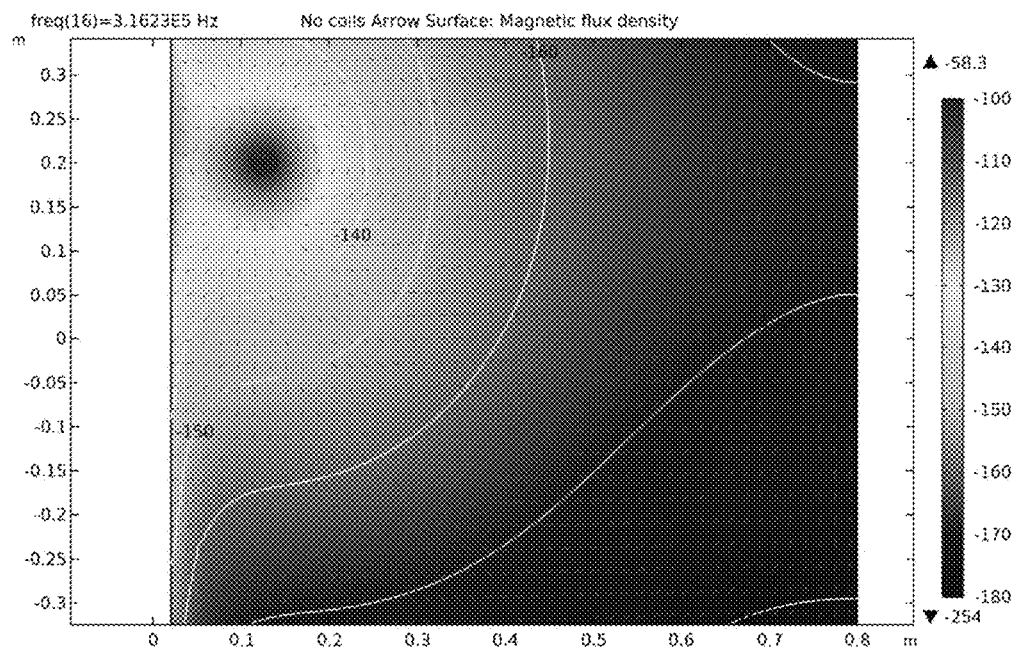
FIG. 7 shows magnetic flux density amplitude (in dBT) for Case 1 (no coils) f=0.31 MHz.
Figure 8:
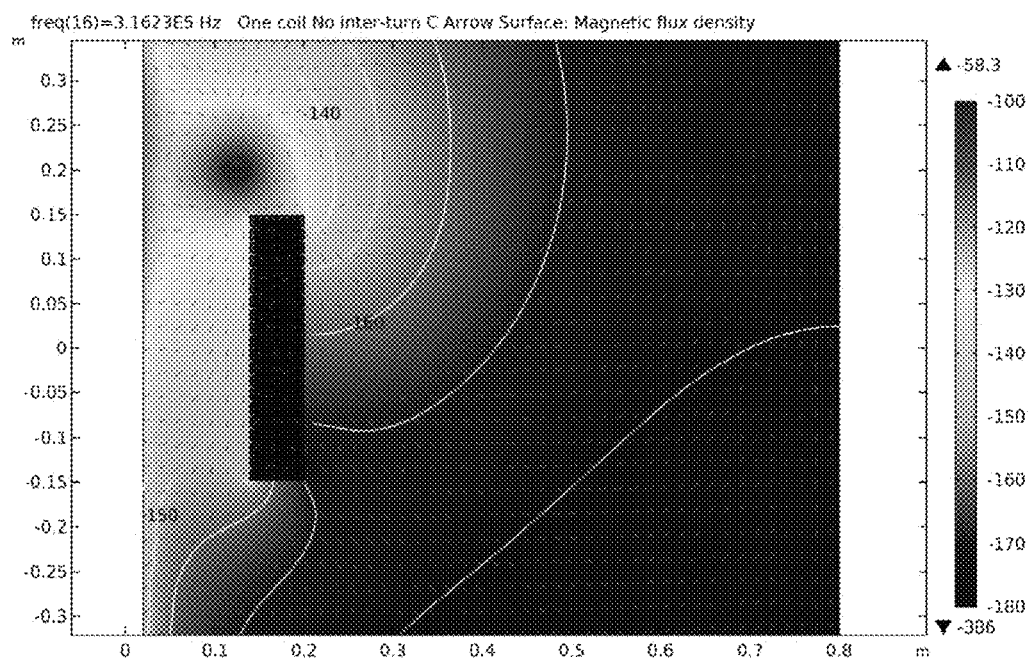
FIG. 8 shows magnetic flux density amplitude (in dBT) for Case 4 (one coil, no inter-turn capacitance). f=0.31 MHz.
Figure 9:
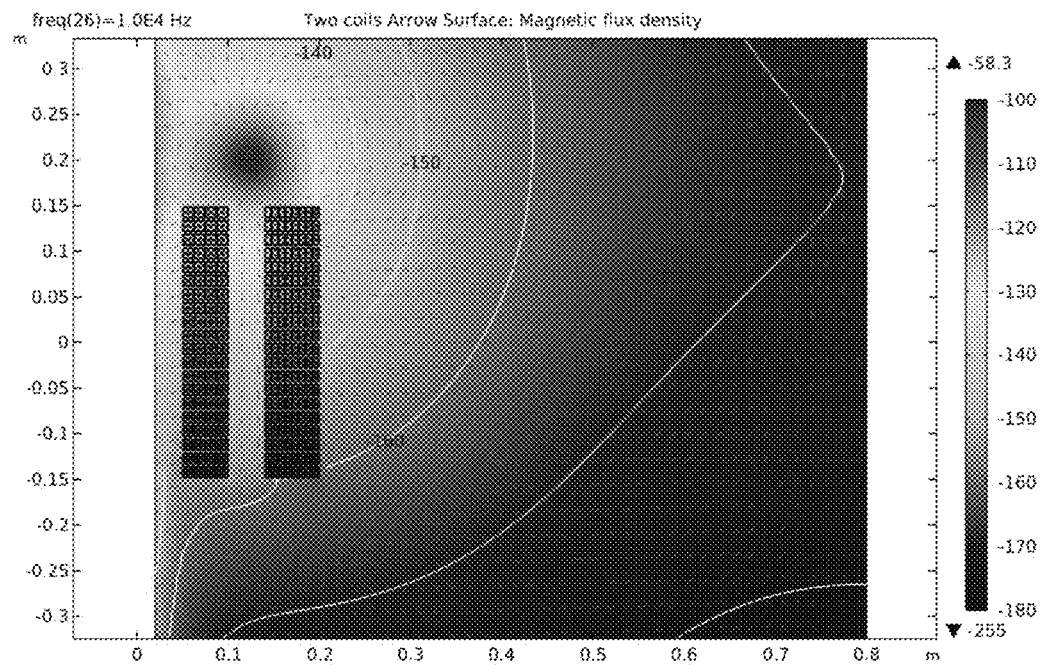
FIG. 9 shows magnetic flux density amplitude (in dBT) for case 2 (two coils), f=0.01 MHz.
Figure 10:
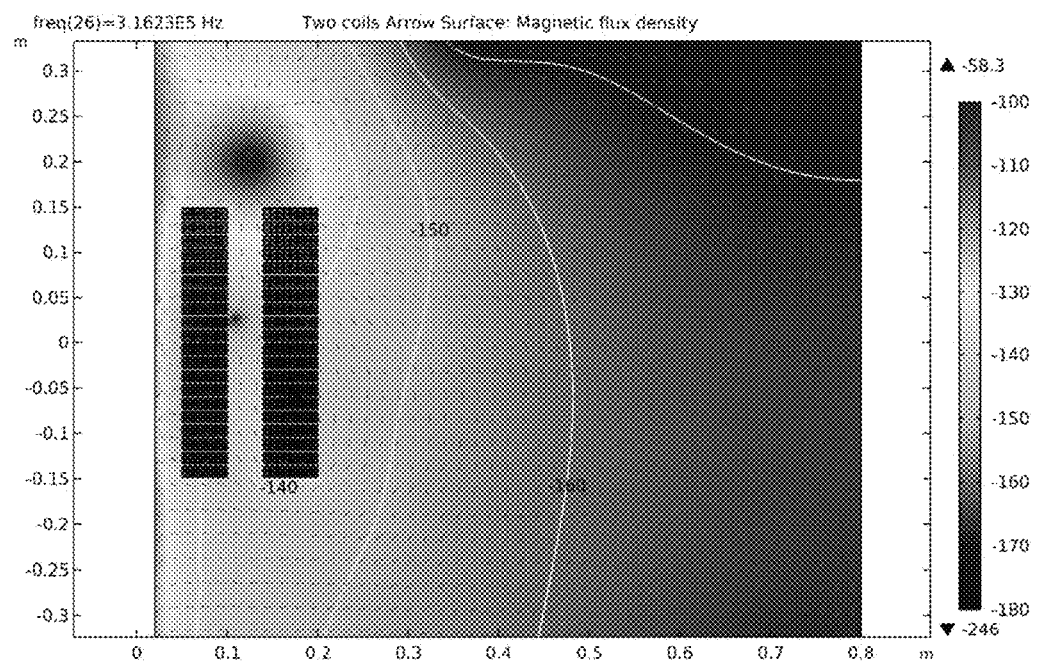
FIG. 10 shows magnetic flux density amplitude (in dBT) for Case 2 (two coils), f=0.31 MHz.
Figure 11:
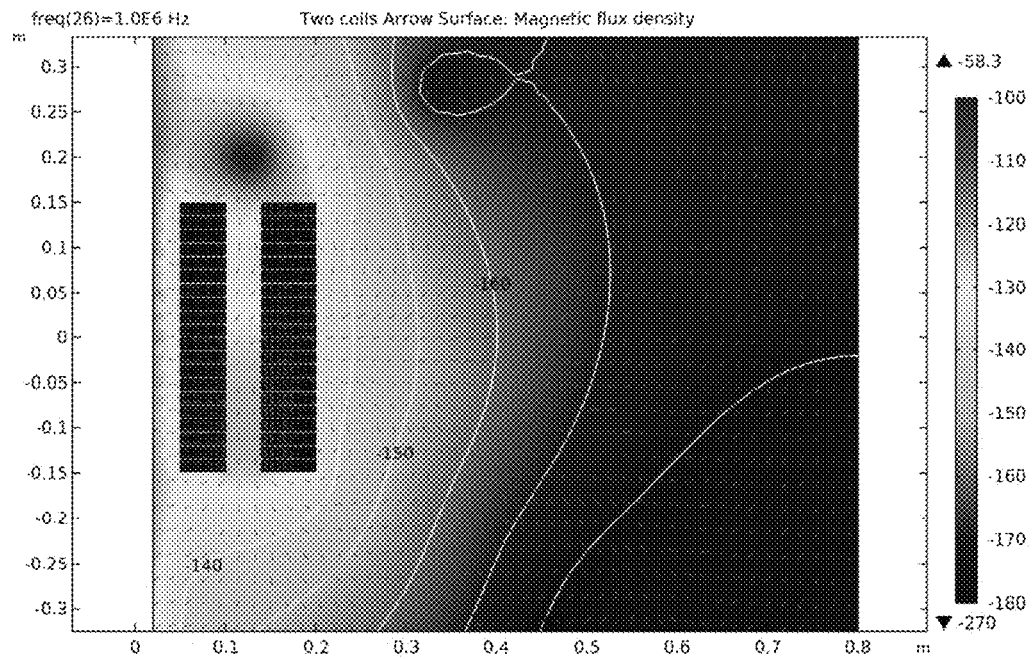
FIG. 11 shows magnetic flux density amplitude (in dBT) for case 2 (two coils), f=1.00 MHz.
Figure 12:
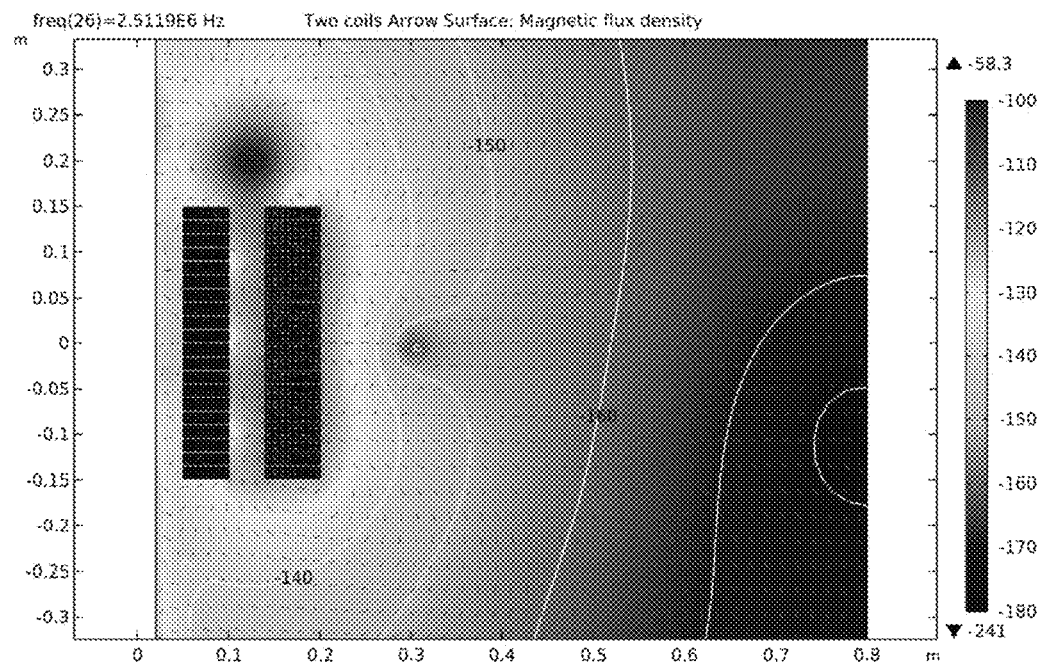
FIG. 12 shows magnetic flux density amplitude (in dBT) for case 2 (two coils), f=2.51 MHz.
Figure 13:
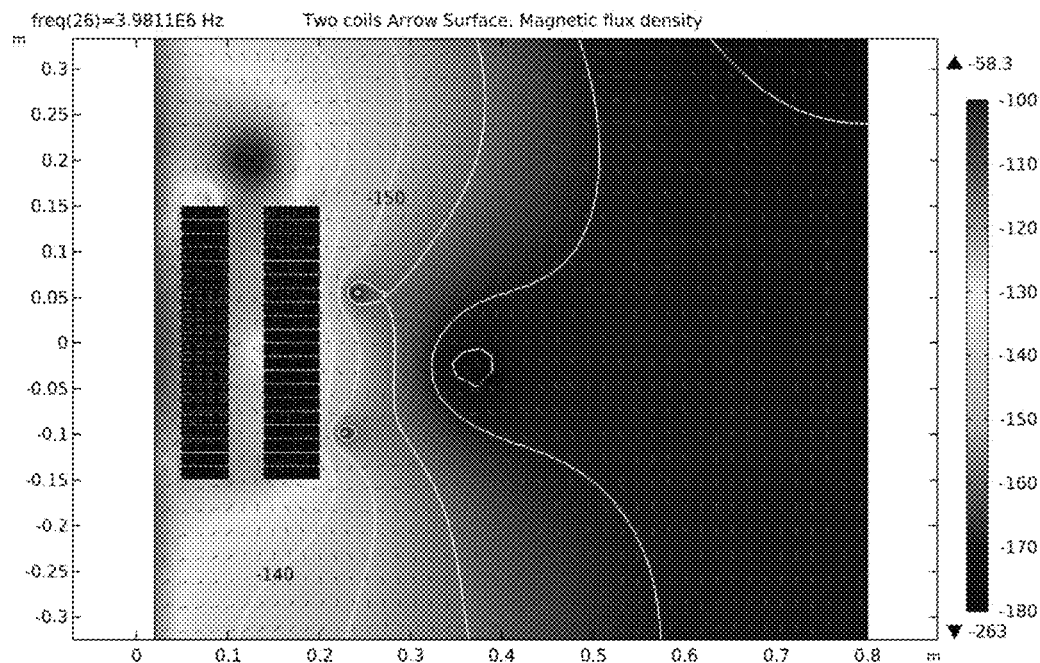
FIG. 13 shows magnetic flux density amplitude (in dBT) for case 2 (two coils), f=3.98 MHz.
Figure 14:
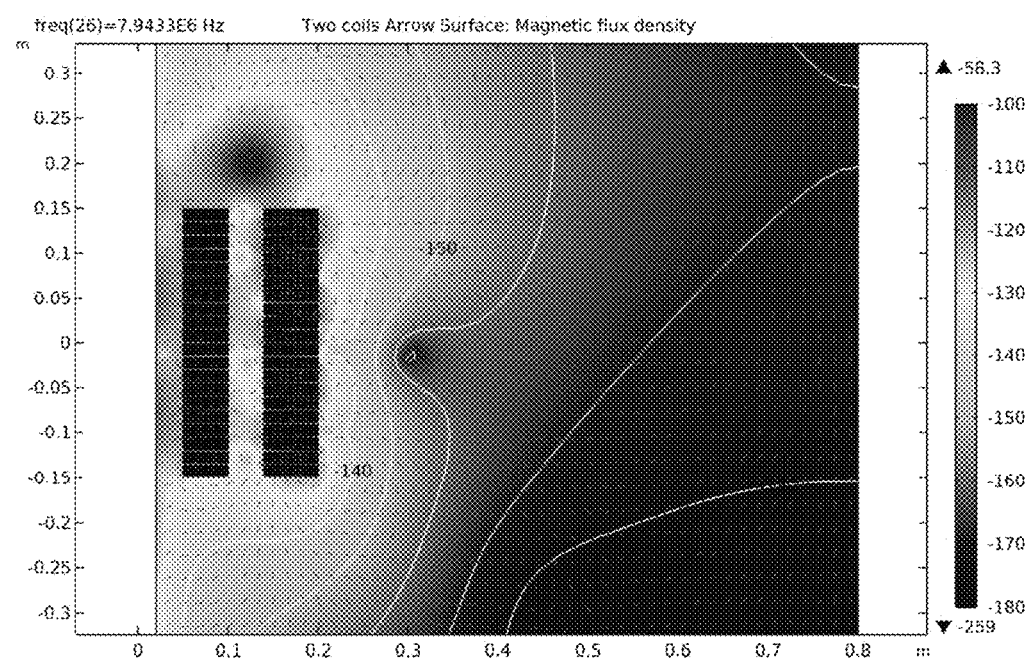
FIG. 14 shows magnetic flux density amplitude (in dBT) for case 2 (two coils), f=7.94 MHz.

Firstly, when comparing FIG. 8 to FIG. 7, it is observed that when winding resonances are prevented from being excited, a coil has a significant screening effect and significantly reduces the signal amplitude on the opposite side seen from the source. Secondly, FIGS. 9-14 further highlight the results in FIG. 5 and FIG. 6. In particular, it is illustrated how some of the resonances create a significantly increased signal range in almost all directions. Notably, this occurs at the frequencies f=0.31 MHz (FIG. 10) and f=2.51 MHz (FIG. 12).

In the 2D axisymmetric model used, the source is given by two closely separated rings carrying equal but oppositely directed currents. The exciting magnetic field is therefore evenly distributed at all angles around the symmetry axis. In reality, however, the transmitting antenna is almost always much smaller and therefore creates a more localized exciting field, which is not evenly distributed around the symmetry axis. One consequence of this is that the winding resonances will not be excited as strongly as with an axisymmetric source. It should be noted though that the resonant modes, and hence the associated magnetic field, will still be axisymmetric.

The 2D axisymmetric simulations show that by utilizing winding resonances of electromagnetic devices, the range for wireless transmission of data or power in the surrounding of an electromagnetic device can be extended.

Further modifications of aspects of the present disclosure within the scope of the claims would be apparent to a skilled person.

The invention claimed is:

1. An electromagnetic device comprising a magnetic field-generating electric circuit comprising at least one winding, and a system configured to monitor a condition of said electromagnetic device and/or to control said electromagnetic device, whereby said condition-monitoring and/or control system comprises:
   at least one first device comprising a transmitter/transceiver, and
   at least one second device comprising a receiver/transceiver,
   whereby said at least one first device is configured to wirelessly transmit at least one signal to said at least one second device,
   wherein said at least one first device is configured to transmit said at least one signal at a frequency that corresponds to a resonance frequency of said at least one winding of said electromagnetic device, whereby said electromagnetic device is thereby configured to be used as a passive repeater for the at least one signal that is transmitted.

2. An electromagnetic device and a condition-monitoring and/or control system according to claim 1, wherein said at least one signal is at least one data signal, or at least one power signal, or a combination of at least one data signal and at least one power signal.

3. An electromagnetic device and a condition-monitoring and/or control system according to claim 1, wherein said monitoring and/or control system lacks additional receivers or transmitters acting solely as repeaters or relay transmitters to enhance the transmission of the at least one signal.

4. An electromagnetic device and a condition-monitoring and/or control system according to claim 1, wherein said electromagnetic device comprises at least one of the following: a transformer, a power transformer, a reactor, a generator, a rotating electric machine, a synchronous machine, an asynchronous machine, a motor, r, a power electronics-based device, such as a High Voltage Direct Current (HVDC) installation or Flexible AC Transmission System (FACTS).

5. An electromagnetic device and a condition-monitoring and/or control system according to claim 1, wherein said at least one first device and the at least one second device comprises at least one of the following: a sensor, a control unit, an energy harvesting device, a processor, a display means, a user interface, a remote terminal unit (RTU), a data storage unit, a gateway.

6. An electromagnetic device and a condition-monitoring and/or control system according to claim 1, wherein said at least one first device and/or said at least one second device is/are located at one of the following locations: radially within said at least one winding of said electromagnetic device, inside a tank of said electromagnetic device, at a distance of less than 50 meters from said at least one winding of said electromagnetic device.

7. An electromagnetic device comprising a magnetic field-generating electric circuit and a condition-monitoring and/or control system according to claim 1, wherein said frequency is in the range 1 kHz to 1 GHz.

8. A method for monitoring a condition of an electromagnetic device comprising a magnetic field-generating electric circuit comprising at least one winding, and/or for controlling an electromagnetic device comprising a magnetic field-generating electric circuit comprising at least one winding, whereby the method comprises the steps of:
   providing a condition-monitoring and/or control system that comprises at least one first device comprising a transmitter/transceiver and at least one second device comprising a receiver/transceiver, and
   wirelessly transmitting at least one signal from said at least one first device to said at least one second device,
   wherein said method also comprises the step of:
   configuring said at least one first device to transmit said at least one signal at a frequency that corresponds to a resonance frequency of said at least one winding of said electromagnetic device that is to be monitored and/or controlled by said condition-monitoring and/or control system, thereby using said electromagnetic device as a passive repeater for the at least one signal that is transmitted.

9. A method according to claim 8, wherein the method comprises the step of wirelessly transmitting at least one data signal and/or at least one power signal.

10. A method according to claim 8, wherein the method lacks a step of wirelessly transmitting said at least one signal using additional receivers or transmitters acting solely as repeaters or relay transmitters to enhance the transmission of the at least one signal.

11. A method according to claim 8, wherein said at least one first device and the at least one second device comprises at least one of the following: a sensor, a control unit, an energy harvesting device, a processor, a display means, a user interface, a remote terminal unit (RTU), a data storage unit, a gateway.

12. A method according to claim 8, wherein the method comprises the step of locating said at least one first device and/or said at least one second device at one of the following locations: radially within said at least one winding of said electromagnetic device, inside a tank of said electromagnetic device, at a distance of less than 50 meters from said at least one winding of said electromagnetic device.

13. A method according to claim 8, wherein said frequency is in the range 1 kHz to 1 GHz.

14. A method according to claim 8, wherein said electromagnetic device comprises at least one of the following: a transformer, a power transformer, a reactor, a generator, a rotating electric machine, a synchronous machine, an asynchronous machine, a motor, r, a power electronics-based device, such as a High Voltage Direct Current (HVDC) installation or Flexible AC Transmission System (FACTS).

* * * * *